(12) United States Patent
Okada et al.

(10) Patent No.: US 9,167,123 B2
(45) Date of Patent: Oct. 20, 2015

(54) IMAGE READER APPARATUS AND METHOD OF DRIVING THE SAME

(75) Inventors: Kouji Okada, Tokyo (JP); Tetsuichiro Yamamoto, Tokyo (JP); Hiroshi Hoshimiya, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 597 days.

(21) Appl. No.: 13/141,452

(22) PCT Filed: Dec. 22, 2009

(86) PCT No.: PCT/JP2009/071842
§ 371 (c)(1),
(2), (4) Date: Jun. 22, 2011

(87) PCT Pub. No.: WO2010/079725
PCT Pub. Date: Jul. 15, 2010

(65) Prior Publication Data
US 2011/0255118 A1    Oct. 20, 2011

(30) Foreign Application Priority Data
Jan. 9, 2009   (JP) .................................. 2009-003674

(51) Int. Cl.
H04N 1/04   (2006.01)
H04N 1/03   (2006.01)
(Continued)

(52) U.S. Cl.
CPC ................. H04N 1/03 (2013.01); G03B 27/54 (2013.01); H04N 1/02865 (2013.01); H04N 1/12 (2013.01); H04N 1/193 (2013.01); H04N 2201/0081 (2013.01)

(58) Field of Classification Search
None
See application file for complete search history.

(56) References Cited

U.S. PATENT DOCUMENTS 4,870,454 A * 9/1989 Kurusu et al. .................... 355/69
5,162,838 A * 11/1992 Inuzuka et al. ................ 358/440
(Continued)

FOREIGN PATENT DOCUMENTS

JP    60098760 A  *  6/1985   ............... H04N 1/04
JP    63-48955 A     3/1988
(Continued)

OTHER PUBLICATIONS

International Search Report for PCT/JP2009/071842 mailed Feb. 2, 2010.
(Continued)

Primary Examiner — Ted Barnes
(74) Attorney, Agent, or Firm — Sughrue Mion, PLLC

(57) ABSTRACT

The present invention provides an image reader apparatus capable of obtaining an image having stable brightness while suppressing an increase of the cost of the apparatus. The image reader apparatus 1 for reading an image on a document 2 being fed and outputting an image signal includes a synchronization signal generation circuit 4 for generating a synchronization signal SS synchronous with a feed timing and a feed cycle of the document 2, a CCD 6 for reading an image on the document 2 in synchronism with the synchronization signal SS, an LED 9 for emitting white light, and a lighting control circuit 7 for turning the LED 9 on in synchronism with the synchronization signal SS and turning the light source off so that a lighting period is equalized for each line irrespective of a variation of the feed cycle of the document 2. The lighting control circuit 7 turns the LED 9 off so that the lighting period of the LED 9 is equal to a predetermined preset period.

15 Claims, 4 Drawing Sheets

(51) Int. Cl.
  *G03B 27/54* (2006.01)
  *H04N 1/028* (2006.01)
  *H04N 1/12* (2006.01)
  *H04N 1/193* (2006.01)

(56) References Cited

U.S. PATENT DOCUMENTS

| | | | | |
|---|---|---|---|---|
| 5,771,106 | A * | 6/1998 | Taguchi et al. | 358/461 |
| 5,991,055 | A * | 11/1999 | Haselby et al. | 358/509 |
| 6,195,180 | B1 * | 2/2001 | Taguchi et al. | 358/461 |
| 6,229,627 | B1 * | 5/2001 | Taguchi et al. | 358/461 |
| 6,275,307 | B1 * | 8/2001 | Segawa | 358/446 |
| 6,456,748 | B1 * | 9/2002 | Yushiya et al. | 382/312 |
| 6,570,671 | B1 * | 5/2003 | Yamaguchi et al. | 358/1.16 |
| 6,963,359 | B1 * | 11/2005 | Aosaki et al. | 348/207.2 |
| 7,064,872 | B1 * | 6/2006 | Jeran | 358/475 |
| 7,508,492 | B2 * | 3/2009 | Sekigawa et al. | 355/67 |
| 8,004,724 | B2 * | 8/2011 | Sakamoto | 358/509 |
| 8,130,421 | B2 * | 3/2012 | Kikuchi | 358/461 |
| 2002/0057469 | A1 * | 5/2002 | Yushiya et al. | 358/509 |
| 2003/0218671 | A1 * | 11/2003 | Nagafusa et al. | 347/246 |
| 2004/0047007 | A1 * | 3/2004 | Kanno | 358/474 |
| 2005/0002072 | A1 * | 1/2005 | Iguchi | 358/509 |
| 2005/0078886 | A1 * | 4/2005 | Yushiya et al. | 382/312 |
| 2005/0263026 | A1 * | 12/2005 | Aosaki et al. | 101/492 |
| 2006/0238830 | A1 * | 10/2006 | Dikeman | 358/500 |
| 2007/0121175 | A1 * | 5/2007 | Futami | 358/474 |
| 2007/0195379 | A1 * | 8/2007 | Suga | 358/497 |
| 2007/0291331 | A1 * | 12/2007 | Sekizawa et al. | 358/509 |
| 2008/0029687 | A1 * | 2/2008 | Kaihotsu | 250/206 |
| 2008/0297756 | A1 * | 12/2008 | Hirota | 355/67 |
| 2009/0039594 | A1 * | 2/2009 | Sato et al. | 271/258.01 |
| 2009/0086247 | A1 * | 4/2009 | Kikuchi | 358/1.13 |
| 2009/0219584 | A1 * | 9/2009 | Ingendoh | 358/475 |
| 2010/0085615 | A1 * | 4/2010 | Ogino | 358/475 |
| 2010/0118355 | A1 * | 5/2010 | Hanagata | 358/475 |
| 2010/0231991 | A1 * | 9/2010 | Nakajima | 358/475 |
| 2012/0250108 | A1 * | 10/2012 | Wilsher et al. | 358/475 |
| 2013/0114117 | A1 * | 5/2013 | Bustin | 358/475 |
| 2013/0188230 | A1 * | 7/2013 | Sato et al. | 358/486 |

FOREIGN PATENT DOCUMENTS

| | | |
|---|---|---|
| JP | 2-25158 A | 1/1990 |
| JP | 8-88734 A | 4/1996 |
| JP | 2003046716 A | 2/2003 |
| JP | 2004126721 A | 4/2004 |
| JP | 2007184907 A | 7/2007 |
| JP | 2009141523 A | 6/2009 |
| TW | 395118 B | 6/2000 |

OTHER PUBLICATIONS

Japanese Office Action for JP2009-003674 issued Jun. 8, 2010.
Taiwanese Office Action for TW099100097 dated on Apr. 18, 2013.
The extended European search report for EP09837610 dated Jul. 13, 2012.

* cited by examiner

IMAGE READER APPARATUS AND METHOD OF DRIVING THE SAME

This application is the National Phase of PCT/JP2009/071842, filed Dec. 22, 2009, which claims the benefit of priority from Japanese patent application No. 2009-003674, filed on Jan. 9, 2009, the disclosure of which is incorporated herein in its entirety by reference.

TECHNICAL FIELD

The present invention relates to an image reader apparatus for reading an image on a document being fed and outputting an image signal, and a method of driving the same.

BACKGROUND ART

Heretofore, an image reader apparatus for reading an image with an image sensor while emitting light from a light source and outputting an image signal has been utilized as an apparatus for reading an object image such as a printed matter or a photograph (an image on a document) (See, e.g., Japanese laid-open patent publication No. 2004-126721 (Patent Document 1)).

For a light source of such a reader apparatus, LEDs, which consume low electric power and are highly responsive, have heavily been used. Furthermore, for an image sensor, one-dimensional CCD sensors in which a plurality of light-receiving elements are arrayed in one direction have heavily been used. As shown in FIG. 6, a one-dimensional CCD sensor, which may be referred to as "CCD" in context, includes a light-receiving part 33 for storing charges corresponding to the quantity of incident light in respective light-receiving pixels 32, a horizontal transfer part 34 for transferring the charges stored in the light-receiving part 33 in the horizontal direction, an output part 35 for converting the charges transferred from the horizontal transfer part 34 into image signals and outputting the image signals, and the like.

SUMMARY OF THE INVENTION

Problem(s) to be Solved by the Invention

In an image reader apparatus of a type that obtains an image while feeding a document, a CCD 31 should be driven in synchronism with a feeder device (such as a feed motor) for feeding the document. Therefore, a signal indicative of a feed cycle of the feeder device is received from the feeder device, and a synchronization signal is generated from the received signal so as to determine an operation cycle of the CCD 31.

Accordingly, as shown in (a) to (e) of FIG. 7, for example, the CCD 31 operates so as to store a charge corresponding to the nth line (n is a natural number) of an image of a document in the light-receiving part 33 for one cycle of the synchronization signal and then operates so as to store a charge corresponding to the (n+1)th line of the image in the light-receiving part 33 while the image signal of the nth line is outputted (see (d) and (e) of FIG. 7).

However, the feed speed of a document (the rotational speed of the feed motor or the like) often varies in the feeder device. In such a case, since the cycle of the synchronization signal varies, the storage time for one line may be lengthened or shortened in the CCD 31 (see (d) of FIG. 7). Meanwhile, it is customary to continuously turn a light source (LED) on from the beginning to the end of the reading process (see (b) of FIG. 7). At that time, the CCD 31 continuously receives light throughout the entire reading period. Therefore, the period of time for storing the charges becomes equal to the exposure time (see (c) of FIG. 7).

Accordingly, if the feed speed varies as described above, then the exposure time varies in the CCD 31. Thus, when one page of a document is read, some lines have a short exposure time, whereas other lines have a long exposure time. As a result, the brightness of the read image becomes uneven within a page, and the contrast between light and shade becomes scattered. Furthermore, the feed speed is more likely to vary as the feed speed of a document is increased. Therefore, the aforementioned problem becomes significant when a document is fed at a high speed.

One of techniques for solving such a problem may use a high-performance feeder device in which the feed speed does not vary even though a document is fed at a high speed. In such a case, however, an expensive feeder device is required, thereby increasing the cost of the whole reader apparatus.

The present invention has been made in view of the problems in the prior art. It is, therefore, an object of the present invention to provide an image reader apparatus capable of obtaining an image having stable brightness while suppressing an increase of the cost of the apparatus.

Means to Solve the Problem(s)

According to the present invention, an image reader apparatus for reading an image on a document being fed and outputting an image signal comprises synchronization signal generation means for generating a synchronization signal synchronous with a feed timing and a feed cycle of the document; an image sensor for reading an image on the document in synchronism with the synchronization signal; a light source for emitting light; and lighting control means for turning the light source on in synchronism with the synchronization signal and turning the light source off so that a lighting period is equalized for each line irrespective of a variation of a cycle of the synchronization signal.

In one embodiment, the lighting control means turns the light source off so that the lighting period of the light source is equal to a predetermined preset period.

Preferably, the preset period is set to be shorter than the shortest feed cycle determined by a characteristic of a feed mechanism for feeding the document.

According to one embodiment, the lighting control means comprises a measurement part for measuring the lighting period of the light source, a storage part for holding a preset value corresponding to the preset period, a comparator part for comparing an output value of the measurement part with the preset value and outputting a coincidence signal when the output value of the measurement part coincides with the preset value, and a turning-off signal output part for outputting a turning-off signal for turning the light source off in accordance with the coincidence signal outputted from the comparator part.

According to one embodiment, the image sensor is a one-dimension CCD sensor for reading each line of an image on the document.

According to another aspect of the present invention, there can be provided a method of driving an image reader apparatus including a light source arranged so as to emit light to a document and an image sensor for converting contrast between light and shade of an image on the document into an image signal, characterized by: generating a synchronization signal synchronous with a timing of the document being fed and a feed cycle; activating a reading operation of the image sensor in synchronism with the synchronization signal; and turning the light source on in synchronism with the synchronization signal and turning the light source off so that a lighting period is equalized for each line irrespective of a variation of a cycle of the synchronization signal.

Effect(s) of the Invention

According to the present invention, it is possible to obtain an image reader apparatus capable of obtaining an image having stable brightness while suppressing an increase of the cost of the apparatus.

EXEMPLARY EMBODIMENT(S) FOR CARRYING OUT THE INVENTION

Next, exemplary embodiments of the present invention will be described in detail with reference to the drawings.

Figure 1:
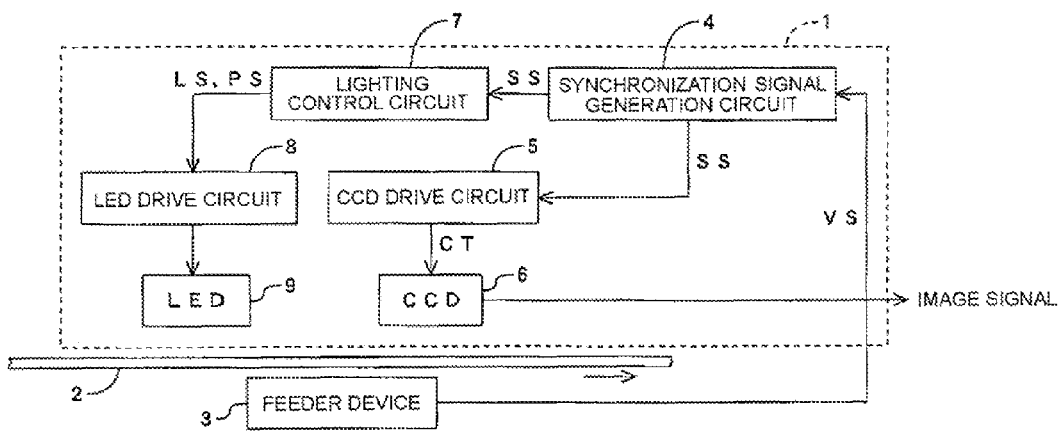
FIG. 1 is an overall configuration diagram showing an image reader apparatus according to an exemplary embodiment of the present invention.

FIG. 1 is an overall configuration diagram showing an image reader apparatus according to an exemplary embodiment of the present invention. This image reader apparatus 1 is formed as an image reading unit that is separate from a feeder device 3 for feeding a document 2. The reader apparatus 1 includes a synchronization signal generation circuit 4, a CCD drive circuit 5, a CCD 6, a lighting control circuit 7, an LED drive circuit 8, an LED 9, and the like.

The synchronization signal generation circuit 4 is for synchronizing the operations of the CCD 6 and the LED 9 with the operation of the feeder device 3. The synchronization signal generation circuit 4 generates a synchronization signal SS based upon a feed cycle signal VS outputted from the feeder device 3.

Figure 4:
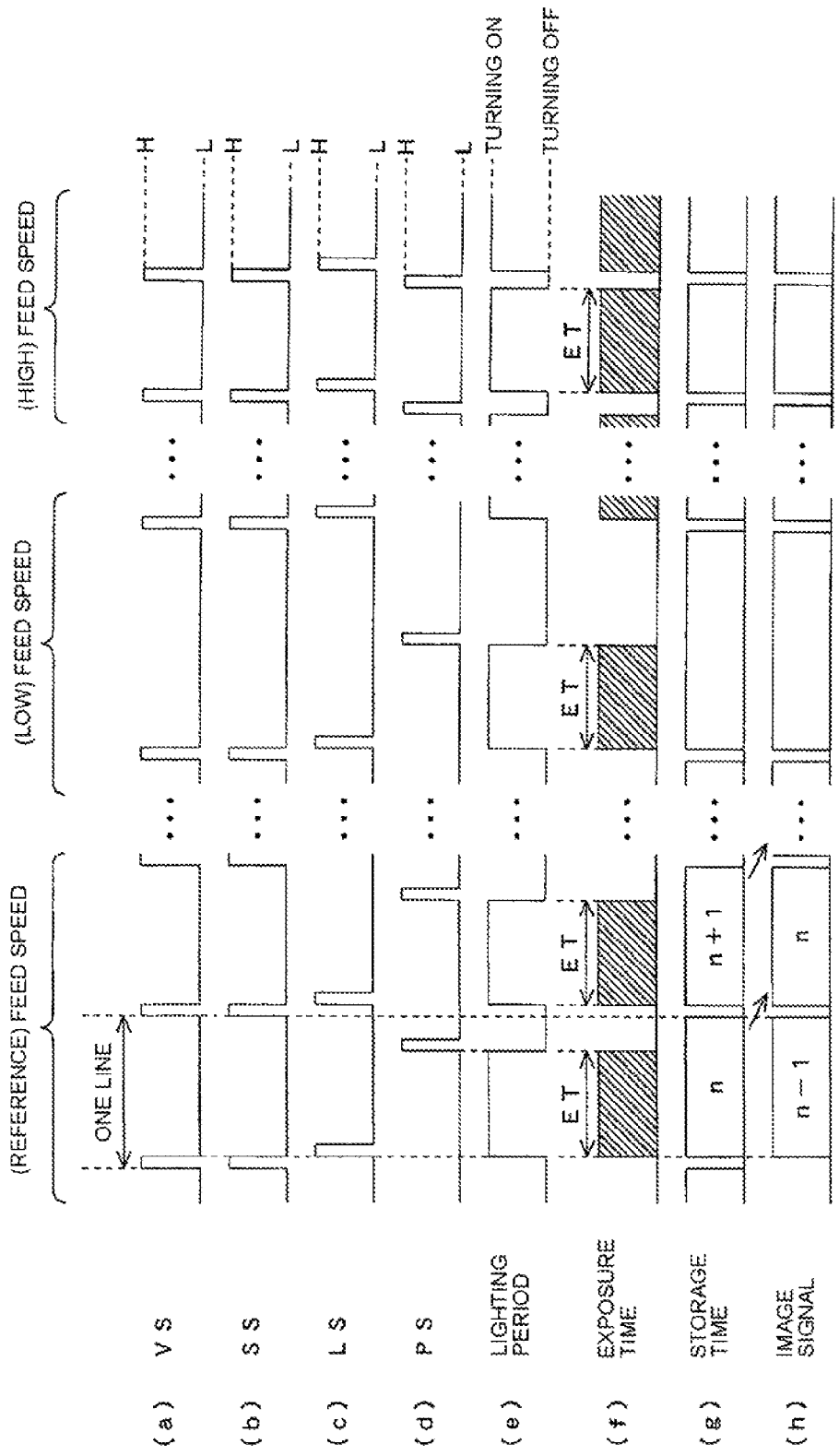
FIG. 4 is a timing chart showing an operation of the image reader apparatus.

The feed cycle signal VS is a signal that is brought into a high level each time the feeder device 3 feeds one line of the document 2 (see (a) of FIG. 4). Thus, the feedcycle signal VS represents the feed timing of the document 2 (the start timing of feeding one line) and the feed cycle (the period of time required to feed one line). For example, the feed cycle signal VS is outputted from a feed mechanism of the feeder device 3 (a feed motor, a peripheral circuit of a feed motor, or the like). Meanwhile, the synchronization signal SS is for determining an operation cycle of the CCD 6 and the LED 9 for one line. The synchronization signal SS is generated so as to be synchronous with the feed cycle signal VS (see (b) of FIG. 4).

Figure 6:
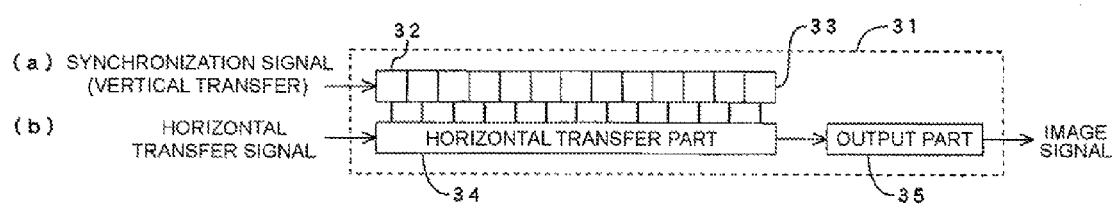
FIG. 6 is a diagram showing a configuration of a one-dimension CCD.
Figure 7:
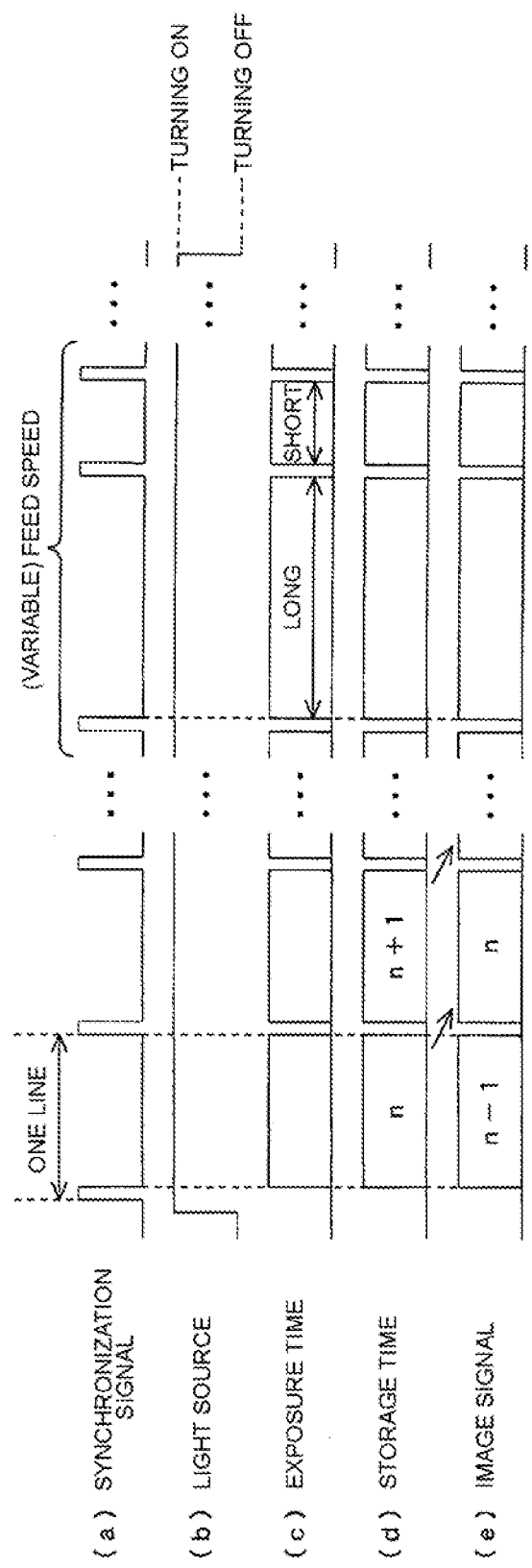
FIG. 7 is a timing chart showing an operation of a conventional image reader apparatus.

The CCD drive circuit 5 is for driving the CCD 6. The CCD drive circuit 5 outputs a CCD drive signal CT in accordance with the synchronization signal generation circuit 4. The CCD 6 is a one-dimension image sensor for reading an image on the document 2 and has the same configuration as the CCD 31 of FIG. 6.

Figure 2:
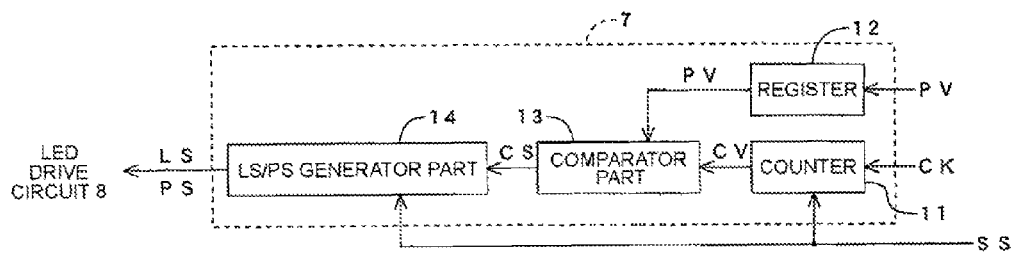
FIG. 2 is a diagram showing a configuration of a lighting control circuit of FIG. 1.

The lighting control circuit 7 is for controlling a lighting period of the LED 9. As shown in FIG. 2, the lighting control circuit 7 includes a counter 11, a register 12, a comparator part 13, a turning-on/turning-off signal generator part (hereinafter referred to as a "LS/PS generator part") 14, and the like.

The counter 11 takes in the synchronization signal SS from the synchronization signal generation circuit 4 and a clock signal having a predetermined cycle (e.g., a reference clock from a clock generator part (not shown)) CK and counts the number of clocks of the clock signal CK over one cycle of the synchronization signal SS. Furthermore, the register 12 is a storage element with a small capacity for holding a preset value PV. Moreover, the comparator part 13 is a comparator circuit for comparing the count value CV of the counter 11 with the preset value PV of the register 12.

Furthermore, the LS/PS generator part 14 is a circuit that outputs a turning-on signal LS for turning the LED 9 on and a turning-off signal PS for turning the LED 9 off. The LS/PS generator part 14 varies a level of the turning-on signal LS based upon the synchronization signal SS and varies a level of the turning-off signal PS based upon the comparison result of the comparator part 13 (coincidence signal CS).

The preset value PV held in the register 12 is for determining a lighting period of the LED 9 for one line. The preset value PV is set in advance by a designer of the image reader apparatus 1, a user, or the like. For setting the preset value PV, a lighting period required for the LED 9 to read one line of the document is determined, and the number of clocks of the clock signal CK during the determined period is obtained. The obtained number of clocks is defined as the preset value PV.

Figure 3:
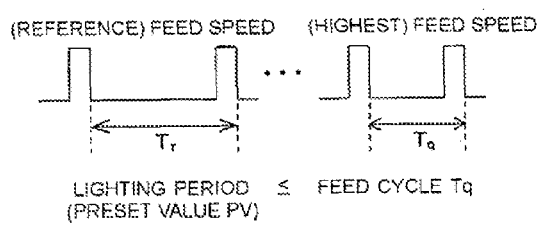
FIG. 3 is a diagram showing the relationship between a preset value and a feed cycle.

At that time, the "lighting period for the LED 9 to read one line of the document" is determined in consideration of the characteristics of the feed mechanism in the feeder device 3 (characteristics of the feed motor or the like). Specifically, as shown in FIG. 3, that period is set so as to be shorter than the shortest feed cycle Tq that is expected from the characteristics of the feed mechanism (a feeding period for one line of the document at the time when the feed speed becomes highest because of the maximum variation of the feed speed).

Referring back to FIG. 1, the LED drive circuit 8 is for driving the LED 9, which serves as a light source. The LED drive circuit 8 supplies a driving current to the LED 9 in accordance with the turning-on signal LS and the turning-off signal PS from the lighting control circuit 7.

Next, operation of the image reader apparatus 1 having the above configuration will be described with reference to FIGS. 1 to 5.

As shown in FIG. 4, when a feed cycle signal VS (see (a) of FIG. 4) is inputted from the feeder device 3, the synchronization signal generation circuit 4 generates a synchronization signal SS synchronous with the feed cycle signal VS (see (b) of FIG. 4) and outputs the synchronization signal SS to the lighting control circuit 7 and the CCD drive circuit 5. Then the lighting control circuit 7 brings a turning-on signal LS into a high level in response to the falling of the synchronization signal SS and turns the LED 9 on via the LED drive circuit 8 (see (c) and (e) of FIG. 4). Thus, exposure of the CCD 6 is started (see (f) of FIG. 4).

Figure 5:
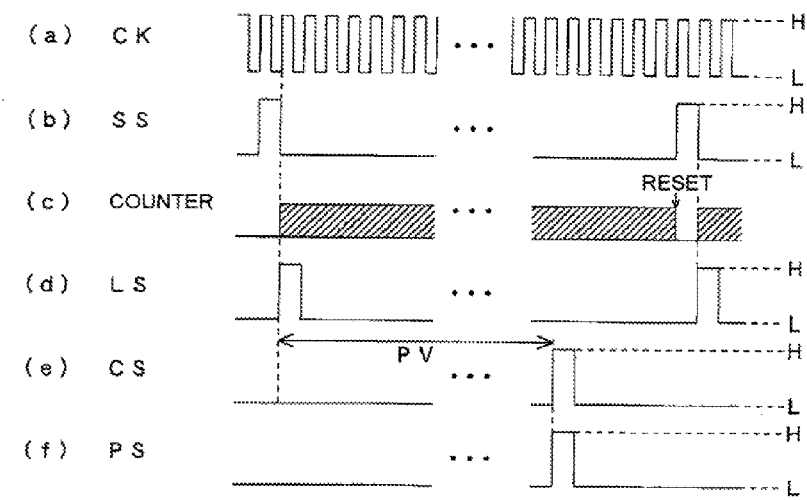
FIG. 5 is a timing chart showing an operation of the lighting control circuit.

At the same time, as shown in FIG. 5, the counter 11 of the lighting control circuit 7 starts a counting operation of the clock signal CK (see (b) of FIG. 5). The comparator part 13 compares the count value CV of the counter 11 with the preset value PV of the register 12 and monitors whether or not the count value CV coincides with the preset value PV. Thus, the measurement and monitor of the lighting period of the LED 9 are started and then continued.

Meanwhile, as shown in FIG. 4, the CCD drive circuit 5 outputs a CCD drive signal CT in synchronism with the synchronization signal SS. The charge of the (n−1)th line (n is a natural number) stored in the light-receiving part 33 of the CCD 6 (see FIG. 6) is transferred to the horizontal transfer part 34, and accumulation of the nth charge is started in the light-receiving part 33 (see (g) and (h) of FIG. 4).

When the count value CV of the counter 11 reaches the preset value PV in the comparator part 13 of the lighting control circuit 7 after a predetermined period of time, as shown in FIG. 5, the comparator part 13 brings the coincidence signal CS into a high level, whereas the LS/PS generator part 14 brings the turning-off signal PS into a high level (see (e) and (f) of FIG. 5). As a result, the LED 9 is turned off as shown in FIG. 4. The exposure of the CCD 6 is accordingly interrupted (see (e) and (f) of FIG. 4).

Subsequently, while a state in which the LED 9 has been turned off is continued until the synchronization signal SS is brought into a high level again, the charge of the nth line is stored in the light-receiving part 33 of the CCD 6 (see (e) and (g) of FIG. 4). After that, for reading other lines, the turning-off timing of the LED 9 is controlled in the same manner as described above such that the lighting period of the LED 9 becomes equal to a preset period.

Thus, upon reading each line in the present embodiment, the turning-on and turning-off of the LED 9 are controlled such that the lighting period of the LED 9 becomes equal to a preset period. Therefore, even if the feed speed of the document 2 varies in the feeder device 3 so that the cycle of the synchronization signal SS is shortened or lengthened, the same lighting period can be maintained for each line (see (e) of FIG. 4). Accordingly, the exposure time ET of the CCD 6 can be equalized irrespective of variations of the feed speed (see (f) of FIG. 4). Thus, unevenness in brightness of a read image can be prevented without use of a high-performance feeder device. Therefore, it is possible to obtain an image reader apparatus capable of obtaining an image having stable brightness while suppressing an increase of the cost of the apparatus.

The above embodiment describes a case where one line of the document 2 is read at a time with use of a one-dimension CCD as the image sensor. For example, the present invention is applicable to cases where a plurality of lines of the document 2 is read at a time with use of a two-dimension CCD or with use of a plurality of one-dimension CCDs.

Furthermore, in the above embodiment, only the lighting period of the LED 9 is measured, and the timing of turning the LED 9 off is controlled such that the lighting period becomes equal to a preset period. A cycle of the synchronization signal SS may be monitored, and the lighting period of the LED 9 may be subjected to a feedback control.

According to an aspect of the present invention, since an exposure time can be equalized in an image sensor irrespective of variations of the feed speed of a document, unevenness in brightness of a read image can be prevented without use of a high-performance feeder device. Therefore, it is possible to obtain an image having stable brightness while suppressing an increase of the cost of the apparatus.

According to an embodiment, lighting control means of an image reader apparatus turns the light source off such that the lighting period of the light source is equal to a predetermined preset period. Therefore, the lighting period of the light source can be equalized for each line with a simple control technique.

The preset period is set to be shorter than the shortest feed cycle determined by the characteristics of a feed mechanism for feeding the document. Thus, the lighting period of the light source can be maintained so as to be shorter than a cycle of the synchronization signal even if the maximum variation is caused to the feed speed. Accordingly, the light source and the image sensor can stably be operated.

Although the above embodiment focuses on an image reader apparatus, various kinds of devices can be assembled by incorporating the image reader apparatus. Such devices include a scanner, a printer, and a facsimile. Those devices include the feeder device 3 as a device for feeding a document as shown in FIG. 1 and the image reader apparatus 1.

According to one embodiment, in a scanner comprising a feeder device for feeding a document and an image reader apparatus for reading an image on the document being fed and outputting an image signal, the image reader apparatus includes synchronization signal generation means for generating a synchronization signal synchronous with a feed timing and a feed cycle of the document; an image sensor for reading an image on the document in synchronism with the synchronization signal; a light source for emitting light; and lighting control means for turning the light source on in synchronism with the synchronization signal and turning the light source off so that a lighting period is equalized for each line irrespective of a variation of a cycle of the synchronization signal.

According to another embodiment, in a printer comprising a feeder device for feeding a document and an image reader apparatus for reading an image on the document being fed and outputting an image signal, the image reader apparatus includes synchronization signal generation means for generating a synchronization signal synchronous with a feed timing and a feed cycle of the document; an image sensor for reading an image on the document in synchronism with the synchronization signal; a light source for emitting light; and lighting control means for turning the light source on in synchronism with the synchronization signal and turning the light source off so that a lighting period is equalized for each line irrespective of a variation of a cycle of the synchronization signal.

According to still another embodiment, in a facsimile comprising a feeder device for feeding a document and an image reader apparatus for reading an image on the document being fed and outputting an image signal, the image reader apparatus includes synchronization signal generation means for generating a synchronization signal synchronous with a feed timing and a feed cycle of the document; an image sensor for reading an image on the document in synchronism with the synchronization signal; a light source for emitting light; and lighting control means for turning the light source on in synchronism with the synchronization signal and turning the light source off so that a lighting period is equalized for each line irrespective of a variation of a cycle of the synchronization signal.

Although various embodiments and advantages of the present invention have been described above, the above description has been provided by way of example. Reasonable changes can be made without departing from the scope of the present invention. Thus, the present invention should not be limited to the above description.

This application claims the benefit of priority from Japanese patent application No. 2009-003674, filed on Jan. 9, 2009, the disclosure of which is incorporated herein in its entirety by reference.

The invention claimed is:

1. An image reader apparatus for reading an image on a document being fed and outputting an image signal, comprising:

a synchronization signal generator configured to generate a synchronization signal based upon a feed cycle signal outputted from a feeder device, the feed cycle signal representing a feed timing and a feed cycle of the document;

an image sensor configured to read the image on the document in synchronism with the synchronization signal;

a light source configured to emit light; and a lighting controller configured to turn the light source on in synchronism with the synchronization signal and to turn the light source off so that a lighting period is equalized for each line irrespective of a variation of a cycle of the synchronization signal, wherein the lighting controller is further configured to monitor the cycle of the synchronization signal, to subject the lighting period of the light source to a feedback control, and to maintain the lighting period to be shorter than the cycle of the synchronization signal even if the maximum variation is caused to a feed speed, and wherein the lighting controller comprises a measurement part configured to take in the synchronization signal from the synchronization signal generator and a clock signal having a predetermined cycle and to count a number of clocks of the clock signal over one cycle of the synchronization signal.

2. The image reader apparatus as recited in claim 1, wherein the lighting controller comprises a storage part configured to hold a preset value corresponding to the preset period, a comparator part configured to compare an output value of the measurement part with the preset value and to output a coincidence signal on the condition that the output value of the measurement part coincides with the preset value, and a turning-off signal output part configured to output a turning-off signal turning the light source off in accordance with the coincidence signal outputted from the comparator part.

3. The image reader apparatus as recited in claim 1, wherein the image sensor is a one-dimension CCD sensor configured to read each line of an image on the document.

4. The image reader apparatus as recited in claim 1, wherein the lighting controller is further configured to control the lighting period of the light source in response to a feedback signal by adjusting the lighting period in relation to the monitored cycle of the synchronization signal.

5. The image reader apparatus as recited in claim 1, wherein the preset period is set to be shorter than the shortest feed cycle determined by a characteristic of a feed mechanism for feeding the document.

6. A method of driving an image reader apparatus comprising a light source arranged so as to emit light to a document and an image sensor converting contrast between light and shade of an image on the document into an image signal, the method comprising:

generating a synchronization signal based upon a feed cycle signal output from a feeder device, the feed cycle signal representing a feed timing and a feed cycle of the document;

activating a reading operation of the image sensor in synchronism with the synchronization signal;

turning the light source on in synchronism with the synchronization signal and turning the light source off so that a lighting period is equalized for each line irrespective of a variation of a cycle of the synchronization signal; and monitoring the cycle of the synchronization signal of the light source, subjecting the lighting period of the light source to a feedback control, and maintaining the lighting period to be shorter than the cycle of the synchronization signal even if the maximum variation is caused to a feed speed; and taking in the synchronization signal from the synchronization signal generator and a clock signal having a predetermined cycle and counting a number of clocks of the clock signal over one cycle of the synchronization signal.

7. The method of driving an image reader apparatus as recited in claim 6, wherein the image sensor is a one-dimension CCD sensor reading each line of an image on the document.

8. The method of driving an image reader apparatus as recited in claim 6, the method further comprising:

controlling the lighting period of the light source in response to a feedback signal by adjusting the lighting period in relation to the monitored cycle of the synchronization signal.

9. The method of driving an image reader apparatus as recited in claim 6, wherein the preset period is set to be shorter than the shortest feed cycle determined by a characteristic of a feed mechanism for feeding the document.

10. A scanner comprising a feeder device configured to feed a document and an image reader apparatus configured to read an image on the document being fed and outputting an image signal, wherein the image reader apparatus comprises:

a synchronization signal generator configured to generate a synchronization signal based upon a feed cycle signal output from a feeder device, the feed cycle signal representing a feed timing and a feed cycle of the document;

an image sensor configured to read the image on the document in synchronism with the synchronization signal;

a light source configured to emit light; and a lighting controller configured to turn the light source on in synchronism with the synchronization signal and to turn the light source off so that a lighting period is equalized for each line irrespective of a variation of a cycle of the synchronization signal, wherein the lighting controller is further configured to monitor the cycle of the synchronization signal, to subject the lighting period of the light source to a feedback control, and to maintain the lighting period to be shorter than the cycle of the synchronization signal even if the maximum variation is caused to a feed speed; and wherein the lighting controller comprises a measurement part configured to take in the synchronization signal from the synchronization signal generator and a clock signal having a predetermined cycle and to count a number of clocks of the clock signal over one cycle of the synchronization signal.

11. The scanner as recited in claim 10, wherein the lighting controller is further configured to control the lighting period of the light source in response to a feedback signal by adjusting the lighting period in relation to the monitored cycle of the synchronization signal.

12. A printer comprising a feeder device configured to feed a document and an image reader apparatus configured to read an image on the document being fed and outputting an image signal, wherein the image reader apparatus comprises:

a synchronization signal generator configured to generate a synchronization signal based upon a feed cycle signal output from a feeder device, the feed cycle signal representing a feed timing and a feed cycle of the document;

an image sensor configured to read the image on the document in synchronism with the synchronization signal;

a light source configured to emit light; and a lighting controller configured to turn the light source on in synchronism with the synchronization signal and to turn the light source off so that a lighting period is equalized for each line irrespective of a variation of a cycle of the synchronization signal, wherein the lighting controller is further configured to monitor the cycle of the synchronization signal, to subject the lighting period of the light source to a feedback control, and to maintain the lighting period to be shorter than the cycle of the synchronization signal even if the maximum variation is caused to a feed speed; and wherein the lighting controller comprises a measurement part configured to take in the synchronization signal from the synchronization signal generator and a clock signal having a predetermined cycle and to count a number of clocks of the clock signal over one cycle of the synchronization signal.

13. The printer as recited in claim 12, wherein the lighting controller is further configured to control the lighting period of the light source in response to a feedback signal by adjusting the lighting period in relation to the monitored cycle of the synchronization signal.

14. A facsimile machine comprising a feeder device configured to feed a document and an image reader apparatus configure to read an image on the document being fed and outputting an image signal, wherein the image reader apparatus comprises:

a synchronization signal generator configured to generate a synchronization signal based upon a feed cycle signal output from a feeder device, the feed cycle signal representing a feed timing and a feed cycle of the document;

an image sensor configured to read the image on the document in synchronism with the synchronization signal;

a light source configured to emit light; and a lighting controller configured to turn the light source on in synchronism with the synchronization signal and to turn the light source off so that a lighting period is equalized for each line irrespective of a variation of a cycle of the synchronization signal, wherein the lighting controller is further configured to monitor the cycle of the synchronization signal, to subject the lighting period of the light source to a feedback control, and to maintain the lighting period to be shorter than the cycle of the synchronization signal even if the maximum variation is caused to a feed speed; and wherein the lighting controller comprises a measurement part configured to take in the synchronization signal from the synchronization signal generator and a clock signal having a predetermined cycle and to count a number of clocks of the clock signal over one cycle of the synchronization signal.

15. The facsimile machine as recited in claim 14, wherein the lighting controller is further configured to control the lighting period of the light source in response to a feedback signal by adjusting the lighting period in relation to the monitored cycle of the synchronization signal.

* * * * *